(12) United States Patent
Ide

(10) Patent No.: US 10,220,464 B2
(45) Date of Patent: Mar. 5, 2019

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 62 days.

(21) Appl. No.: 15/122,288

(22) PCT Filed: Mar. 17, 2015

(86) PCT No.: PCT/JP2015/057874
§ 371 (c)(1),
(2) Date: Aug. 29, 2016

(87) PCT Pub. No.: WO2015/141664
PCT Pub. Date: Sep. 24, 2015

(65) Prior Publication Data
US 2016/0368076 A1    Dec. 22, 2016

(30) Foreign Application Priority Data

Mar. 17, 2014 (JP) .................................. 2014-053152

(51) Int. Cl.
*B23K 9/12* (2006.01)
*B23K 9/00* (2006.01)
(Continued)

(52) U.S. Cl.
CPC .............. *B23K 9/125* (2013.01); *B23K 9/073* (2013.01); *B23K 9/092* (2013.01); *B23K 9/093* (2013.01); *B23K 9/124* (2013.01); *B23K 9/173* (2013.01)

(58) Field of Classification Search
CPC ........ B23K 9/073; B23K 9/0738; B23K 9/09; B23K 9/124; B23K 9/092; B23K 9/093; B23K 9/125; B23K 9/173
(Continued)

(56) References Cited

U.S. PATENT DOCUMENTS

2009/0152252 A1   6/2009   Kawamoto et al.
2012/0111842 A1   5/2012   Fujiwara et al.
(Continued)

FOREIGN PATENT DOCUMENTS

CN    1984742 A    6/2007
CN    102361722 A   2/2012
(Continued)

OTHER PUBLICATIONS

Extended European Search Report in EP15765474.0, dated Oct. 27, 2017.
(Continued)

*Primary Examiner* — Hung D Nguyen
(74) *Attorney, Agent, or Firm* — Greenblum & Bernstein, P.L.C.

(57) ABSTRACT

The present invention improves the stability of arc welding carried out by cyclical repetition of forward feed and reverse feed of a weld wire. An arc welding control method includes repeated forward feed and reverse feed at a weld wire feed rate, according to a prescribed cycle and a prescribed amplitude, and generation of short-circuit time intervals and arc time intervals to carry out welding, wherein the feed rate cycle and/or the amplitude are set automatically on the basis of the average feed rate and the welding rate, or the wire deposition amount per unit of weld length. Further, in the event that the amplitude has changed, feedback control of the forward feed-side shift amount is carried out in such a way that the average value of the feed rate is constant. In so (Continued)

doing, the feed rate cycle and amplitude are always set to optimal values.

1 Claim, 4 Drawing Sheets

(51) Int. Cl.
  *B23K 9/073* (2006.01)
  *B23K 9/173* (2006.01)
  *B23K 9/09* (2006.01)
(58) Field of Classification Search
  USPC ........ 219/136, 137.7, 137 R, 137.71, 137 PS
  See application file for complete search history.

(56) References Cited

U.S. PATENT DOCUMENTS

| 2013/0068744 A1* | 3/2013 | Matsui | B23K 9/092 |
| | | | 219/137 R |
| 2013/0299476 A1 | 11/2013 | Fujiwara et al. | |

FOREIGN PATENT DOCUMENTS

| EP | 2402104 A1 | 1/2012 |
| JP | 5201266 B2 | 2/2013 |
| WO | 2006/129388 | 12/2006 |
| WO | 2011/013321 | 2/2011 |

OTHER PUBLICATIONS

English language translation of Written Opinion (PCT/ISA/237) issued in International Patent Application No. PCT/JP2015/057874, dated Jun. 16, 2015, with PCT/IB/373 and PCT/IB/338.
Search Report issued in International Patent Application No. PCT/JP2015/057874, dated Jun. 16, 2015.
Writen Opinion (PCT/ISA/237) issued in International Patent Application No. PCT/JP2015/057874, dated Jun. 16, 2015.
First Office Action, dated May 2, 2017, from the State Intellectual Property Office (SIPO) of the People's Republic of China for the corresponding Chinese Patent Application No. 201580003081.3 (together with the English language translation thereof).
Second Office Action, dated Dec. 14, 2017, from the State Intellectual Property Office (SIPO) of the People's Republic of China for the corresponding Chinese Patent Application No. 201580003081.3 (together with the English language translation thereof).

* cited by examiner

ARC WELDING CONTROL METHOD

TECHNICAL FIELD

The present invention relates to an arc welding control method of alternating feeding of a welding wire between forward feeding and reverse feeding as to a feeding rate with a predetermined cycle and a predetermined amplitude, and generating short-circuiting periods and arc periods to perform welding.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between forward feeding and reverse feeding periodically (see Patent Document 1, for example). Hereinafter this welding method will be explained.

FIG. 4 is a waveform diagram of the welding method in which the forward feeding and the reverse feeding are alternated periodically as to a feeding rate. (A) of this figure shows a waveform of a feeding rate Fw, (B) of this figure shows a waveform of a welding current Iw and (C) of this figure shows a waveform of a welding voltage Vw. Hereinafter explanation will be made with reference to this figure.

As shown in (A) of this figure, in the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoidalty and shifts on the forward feeding side. Thus as an average value of the feeding rate Fw is positive, the welding wire is fed forwardly in average.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. Then a period from the time t5 to a time t6 is the forward feeding acceleration period again, and a period from the time t6 to a time t7 is the forward feeding deceleration period again. Thus the feeding rate Fw periodically changes according to a feeding rate pattern. This pattern is constituted of a cycle Tf (ms) from the time t1 to the time t5, an amplitude Wf (mm/min) as a difference between the maximum value of the forward feeding at the time t2 and the maximum value of the reverse feeding at the time t4 and a forward-feeding side shift amount Sf (mm/min) which are respectively set to individual predetermined values.

Short circuit between the welding wire and the base material occurs mostly before or after the maximum value of the forward feeding at the time t2. This figure shows a case where the short circuit occurs at a time t21 in the forward feeding deceleration period after the maximum value of the forward feeding. If the short circuit occurs at the time t21, the welding voltage Vw rapidly reduces to a short-circuit voltage value of a few volts as shown in (C) of this figure, whilst the welding current Iw increases gradually as shown in (B) of this figure.

As shown in (A) of this figure, from the time t3, as the feeding rate Fw is placed in the reverse feeding period, the welding wire is reversely fed. The short circuit is released by this reverse feeding, and hence an arc is regenerated at a time t31. The arc is regenerated mostly before or after the maximum value of the reverse feeding at the time t4. This figure shows a case where the arc is generated at the time t31 in the reverse feeding acceleration period before the peak value of the reverse feeding. Thus a time period from the time t21 to the time t31 corresponds to the short-circuiting period.

If the arc is regenerated at the time t31, the welding voltage Vw increases rapidly to an arc voltage value of several tens of volts as shown in (C) of this figure. As shown in (B) of this figure, the welding current Iw starts changing from the maximum value state in the short-circuiting period.

As shown in (A) of this figure, during a period from the time t31 to the time t5, as the feeding rate Fw is in the reverse feeding state, the welding wire is raised and hence a length of the arc becomes longer gradually. If the arc length becomes longer, the welding voltage Vw increases, and hence the welding current Iw reduces due to a constant voltage control. Thus during a reverse feeding period Tar in the arc period from the time t31 to the time t5, the welding voltage Vw increases gradually as shown in (C) of this figure, whilst the welding current Iw reduces gradually as shown in (B) of this figure.

Then the next short circuit occurs at a time t61 within the forward feeding deceleration period from the time t6 to the time t7, The short circuit occurred at the time t61 is later in a time (phase) from the maximum value of the forward feeding than the short circuit occurred at the time t21. In this manner, the occurrence timing of short circuit has a certain degree of valiance. A time period from the time t31 to the time t61 corresponds to the arc period. As shown in (A) of this figure, during a period from the time t5 to the time t61, as the feeding rate Fw is in the forward feeding state, the welding wire is forwardly fed and hence a length of the arc becomes shorter gradually. If the arc length becomes shorter, the welding voltage Vw reduces, and hence the welding current Iw increases due to the constant voltage control. Thus during a forward feeding period Tas in the arc period from the time t5 to the time t61, the welding voltage Vw reduces gradually as shown in (C) of this figure, whilst the welding current Iw increases gradually as shown in (B) of this figure.

As described above, in the welding method of repeating the forward feeding and the reverse feeding of the welding wire alternately, the repetition cycle of short circuit and arc can be set to a desired value despite that such the setting is impossible in the related art of the feeding at a constant feeding rate. Thus a generation amount of spatter can be reduced, and improvement of welding quality such as improvement of bead appearance can be achieved.

According to the invention of the patent document 1, an average value of the feeding rate is adjusted according to a welding current setting value, and a repetition frequency and an amplitude of the forward feeding and the reverse feeding of the welding wire are adjusted to individual values according to the welding current setting value. As a result, welding can be performed stably even if the welding current setting value changes.

PRIOR ART DOCUMENT

Patent Document

Patent Document 1: Japanese Patent No. 5201266

SUMMARY OF INVENTION

Problems to be Solved by Invention

However, even if the welding current setting value (average value of the feeding rate) is constant, a welding state becomes unstable if the feeding rate pattern of the welding wire is made constant between a low speed and a high speed of the welding. Similarly the welding state becomes unstable if the feeding rate pattern of the welding wire is made constant between a small wire deposition amount and a large wire deposition amount per unit length of the weld.

Accordingly an object of the present invention is to provide an arc welding control method which, in an arc welding of alternating feeding of a welding wire between forward feeding and reverse feeding, can maintain a welding state stably even if a speed of welding or a wire deposition amount per unit length of weld changes.

Means for Solving Problems

In order to solve the above-described problem, according to the present invention, there is provided an arc welding control method of alternating feeding of a welding wire between forward feeding and reverse feeding as to a feeding rate with a predetermined cycle and a predetermined amplitude, and generating short-circuiting periods and arc periods to perform welding, the arc welding control method comprising: setting the cycle and/or the amplitude based on a welding speed or a wire deposition amount per unit length of weld.

According to the present invention, the arc welding control method further comprising controlling the feeding rate in a manner that an average value of the feeding rate is constant even if the amplitude changes.

Advantageous Effects of Invention

According to the present invention, even if the welding speed or the wire deposition amount per unit length of the weld changes, as the cycle and/or amplitude of the feeding rate change to individual suitable values, a stable welding state can be maintained.

EMBODIMENTS OF INVENTION

Hereinafter embodiments according to the present invention will be explained with reference to drawings.

[First Embodiment]

According to the first embodiment of the present invention, a cycle and/or amplitude of a feeding rate are set based on a speed of welding.

Figure 1:
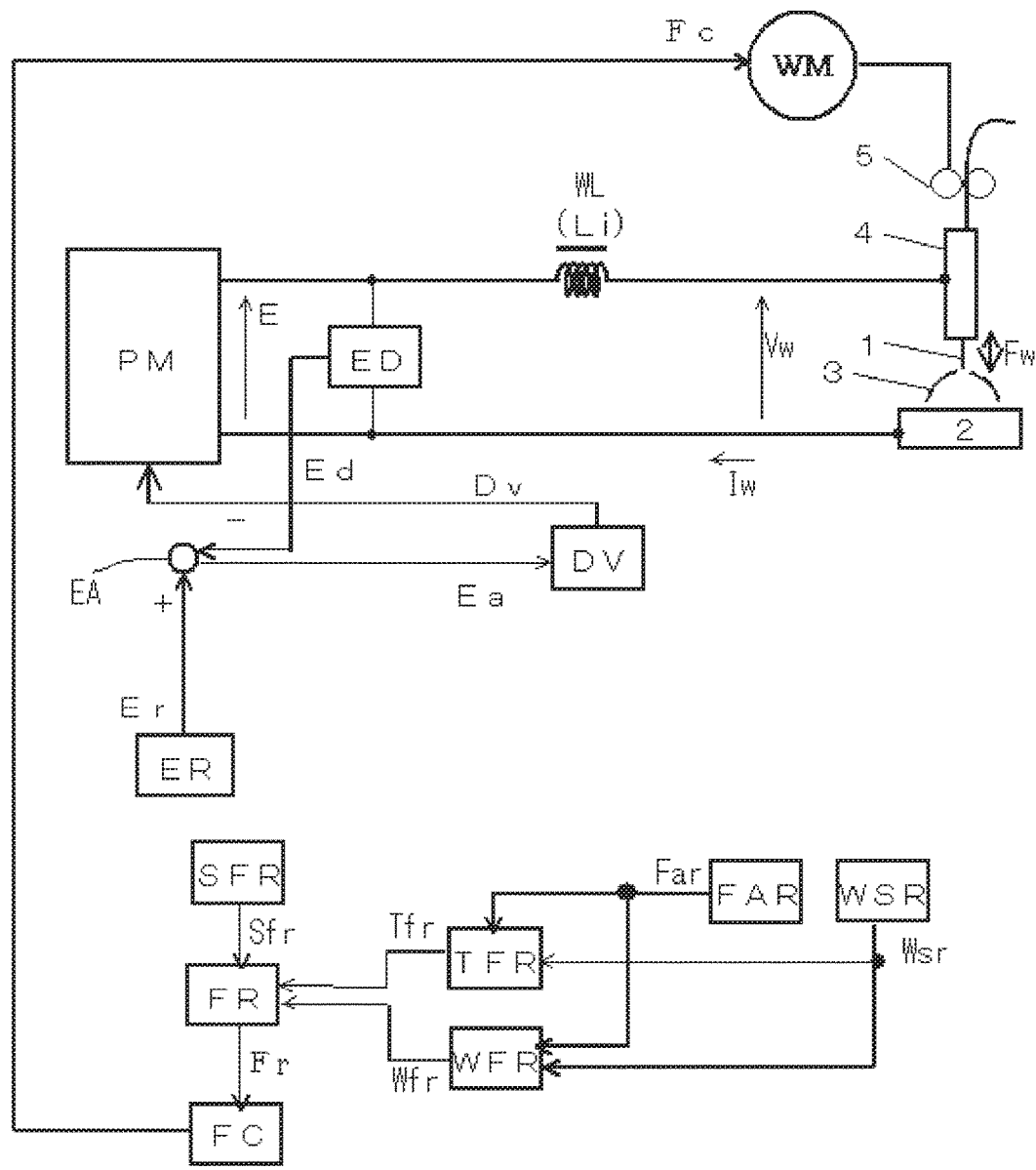
FIG. 1 A block diagram illustrating a welding power supply for implementing an arc welding control method according to a first embodiment of the present invention.

FIG. 1 is a block diagram illustrating a welding power supply for implementing an arc welding control method according to the first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to a drive signal Dv described later, and outputs an output voltage E. Although not shown in the figure, this power supply main circuit PM includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smooths the output voltage E. An inductance value of the reactor WL is, for example, 200 µH.

Using a feed control signal Fc described later as input, a feeding motor WM feeds a welding wire 1 at a feeding rate Fw in a manner of alternating forward feeding and reverse feeding periodically. A motor having high transient responsiveness is used as the feeding motor WM. In some cases, the feeding motor WM is installed near a tip of a welding torch 4 in order to increase a changing rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM and thus an arc 3 is generated between this wire and base material 2. A welding voltage Vw is applied between a power supply tip (not shown) within the welding torch 4 and the base material 2, and thus a welding current Iw flows.

An output voltage setting circuit ER outputs an output voltage setting signal Er set in advance. An output voltage detection circuit ED detects and smooths the output voltage E, thereby outputting an output voltage detection signal Ed.

Using the output voltage setting signal Er and the output voltage detection signal Ed as input, a voltage error amplifier circuit EA amplifies an error between the output voltage setting signal Er (+) and the output voltage detection signal Ed (−) and outputs a voltage error amplified signal Ea. This circuit controls the welding power supply to a constant voltage.

Using the voltage error amplified signal Ea as input, a driving circuit DV performs a PWM modulation control based on the voltage error amplified signal Ea and outputs the drive signal Dv for driving the inverter circuit within the power supply main circuit PM.

An average feeding-rate setting circuit FAR outputs an average feeding-rate setting signal Far set in advance. A welding speed setting circuit WSR outputs a welding speed setting signal Wsr set in advance.

Using the average feeding-rate setting signal Far and the welding speed setting signal Wsr as input, a cycle setting circuit TFR calculates a cycle according to a predetermined cycle setting function and outputs a cycle setting signal Tfr. This cycle setting function is calculated in advance by an experiment. The average feeding-rate setting signal Far has a proportional relation with the cycle setting signal Tfr in a manner that the latter becomes larger as the former becomes larger. On the other hand, the welding speed setting signal Wsr has an inversion proportional relation with the cycle setting signal Tfr in a manner that the latter becomes smaller as the former becomes larger.

Using the average feeding-rate setting signal Far and the welding speed setting signal Wsr as input, an amplitude setting circuit WFR calculates an amplitude according to a predetermined amplitude setting function and outputs an amplitude setting signal Wfr. This amplitude setting function is calculated in advance by an experiment. The average feeding-rate setting signal Far has a proportional relation with the amplitude setting signal Wfr in a manner that the latter becomes larger as the former becomes larger. On the other hand, the welding speed setting signal Wsr has an inversion proportional relation with the amplitude setting signal Wfr in a manner that the latter becomes smaller as the former becomes larger.

A forward-feeding side shift-amount setting circuit SFR outputs a predetermined forward-feeding side shift-amount setting signal Sfr.

Using the cycle setting signal Tfr, the amplitude setting signal Wfr and the forward-feeding side shift-amount setting signal Sfr as input, the feeding-rate setting circuit FR outputs a feeding rate pattern as a feeding-rate setting signal Fr. The feeding rate pattern is configured by shifting a sine wave, formed from the cycle determined by the cycle setting signal Tfr and the amplitude determined by the amplitude setting signal Wfr, by a forward-feeding side shift amount determined by the forward-feeding side shift-amount setting signal Sfr A period where the feeding-rate setting signal Fr is 0 or more is a forward feeding period, whilst a period where this signal is smaller than 0 is a reverse feeding period.

Using the feeding-rate setting signal Fr as input, a feeding control circuit FC outputs, to the feeding motor WM, the feeding control signal Fc for feeding the welding wire 1 at the feeding rate Fw corresponding to a value of the feeding-rate setting signal Fr.

Figure 4:
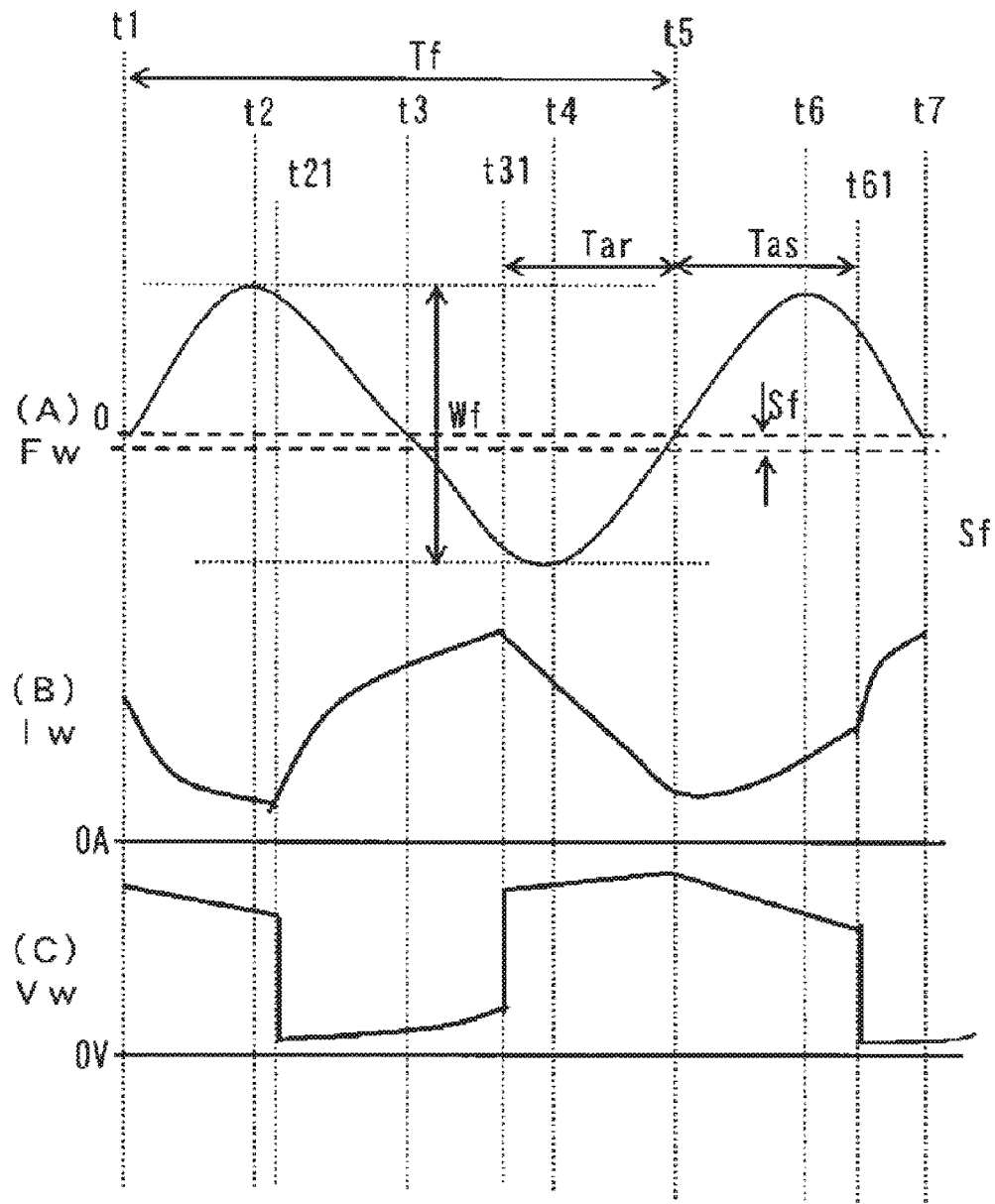
FIG. 4 A waveform diagram of a welding method according to a related art in which forward feeding and reverse feeding are repeated periodically as to a feeding rate.

Waveform diagrams of the feeding rate Fw, the welding current Iw and the welding voltage Vw in FIG. 1 are same as those of FIG. 4, with explanation thereof being omitted. In FIG. 1, if the welding speed setting signal Wsr outputted from the welding speed setting circuit WSR changes, the cycle setting signal Tfr is set to a suitable value by the cycle setting circuit TFR and the amplitude setting signal Wfr is set to a suitable value by the amplitude setting circuit WFR. As a result, in (A) of FIG. 4, if the welding speed changes, the cycle Tf and the amplitude Wf are automatically changed to individual suitable values. Thus a stable welding state can be maintained. In FIG. 1, although the explanation is made as to the case where each of the cycle setting signal Tfr and the amplitude setting signal Wfr changes based on the welding speed setting signal Wsr, only one of these signals may be changed. Further although the explanation is made as to the case where the feeding rate pattern is the sine wave, this pattern may be a triangular wave, a trapezoidal wave or the like.

According to the first embodiment, the cycle and/or amplitude of the feeding rate are set based on the welding speed. Consequently even if the welding speed changes, as the cycle and/or amplitude of the feeding rate change to the individual suitable values, a stable welding state can be maintained.

[Second Embodiment]

In a second embodiment according to the present invention, the cycle and/or amplitude of the feeding rate are set based on a wire deposition amount per unit length of the weld.

Using a radius d (mm) of the welding wire, the average feeding-rate setting signal Far (mm/min) and the welding speed setting signal Wsr (mm/min) as input, a wire deposition amount Md (mm$^3$/mm) per unit length of the weld can be calculated according to the following expression.

$$Md = \pi \cdot d^2 \cdot Far/Wsr \qquad \text{Expression (1)}$$

Figure 2:
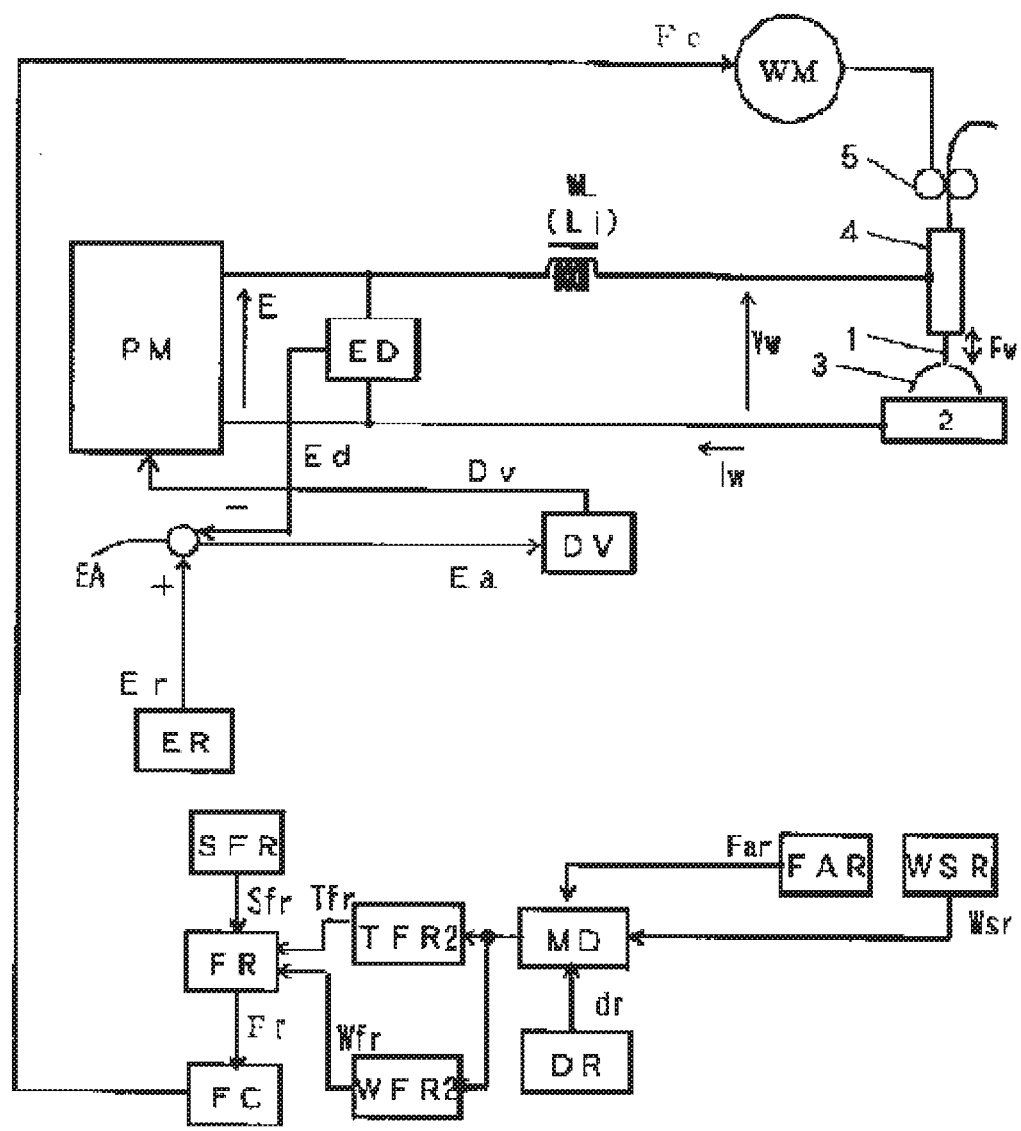
FIG. 2 A block diagram illustrating a welding power supply for implementing an arc welding control method according to a second embodiment of the present invention.

FIG. 2 is a block diagram illustrating a welding power supply for implementing an arc welding control method according to the second embodiment of the present invention. This figure corresponds to FIG. 1, and blocks identical to those of FIG. 1 are referred to by the same symbols, with explanation thereof being omitted. In this figure, a welding-wire radius setting circuit DR and a wire deposition-amount per unit-length of weld calculation circuit MD are added to FIG. 1, the cycle setting circuit TFR of FIG. 1 is replaced by a second cycle setting circuit TFR2, and the amplitude setting circuit WFR of FIG. 1 is replaced by a second amplitude setting circuit WFR2. Hereinafter these individual blocks will be explained with reference to this figure.

The welding-wire radius setting circuit DR sets a radius of the welding wire to be used and outputs a welding-wire radius setting signal dr.

Using the welding-wire radius setting signal dr, the average feeding-rate setting signal Far and the welding speed setting signal Wsr as input, the wire deposition-amount per unit-length of weld calculation circuit MD calculates a wire deposition mount per unit length of the weld according to the expression (1) and outputs a wire deposition-amount per unit-length of weld signal Md.

Using the wire deposition-amount per unit-length of weld signal Md as input, the second cycle setting circuit TFR2 calculates a cycle according to a predetermined second cycle setting function and outputs a cycle setting signal Tfr. This second cycle setting function is calculated in advance by an experiment. The wire deposition-amount per unit-length of weld signal Md has a proportional relation with the cycle setting signal Tfr in a manner that the latter becomes larger as the former becomes larger.

Using the wire deposition-amount per unit-length of weld signal Md as input, the second amplitude setting circuit WFR2 calculates an amplitude according to a predetermined second amplitude setting function and outputs an amplitude setting signal Wfr. This second amplitude setting function is calculated in advance by an experiment. The wire deposition-amount per unit-length of weld signal Md has a proportional relation with the amplitude setting signal Wfr in a manner that the latter becomes larger as the former becomes larger.

Waveform diagrams of the feeding rate Fw, the welding current Iw and the welding voltage Vw in FIG. 2 are same as those of FIG. 4, with explanation thereof being omitted. In FIG. 2, if the wire deposition-amount per unit-length of weld signal Md outputted from the wire deposition-amount per unit-length of weld calculation circuit MD changes, the cycle setting signal Tfr is set to a suitable value by the second cycle setting circuit TFR2 and the amplitude setting signal Wfr is set to a suitable value by the second amplitude setting circuit WFR2. As a result, in (A) of FIG. 4, if the wire deposition amount per unit length of the weld changes, the cycle Tf and the amplitude Wf are automatically changed to individual suitable values. Thus a stable welding state can be maintained. In FIG. 2, although the explanation is made as to the case where each of the cycle setting signal Tfr and the amplitude setting signal Wfr changes based on the wire deposition-amount per unit-length of weld signal Md, only one of these signals may be changed. Further although the explanation is made as to the case where the feeding rate pattern is the sine wave, this pattern may be a triangular wave, a trapezoidal wave or the like.

According to the second embodiment, the cycle and/or amplitude of the feeding rate are set based on the wire deposition amount per unit length of the weld. Consequently even if the wire deposition amount per unit length of the weld changes, as the cycle and/or amplitude of the feeding rate change to individual suitable values, a stable welding state can be maintained.

[Third Embodiment]

In a third embodiment according to the present invention, even if the amplitude (amplitude setting signal Wfr) changes in the first or second embodiment, the feeding rate is controlled so that an average value of the feeding rate becomes constant.

Figure 3:
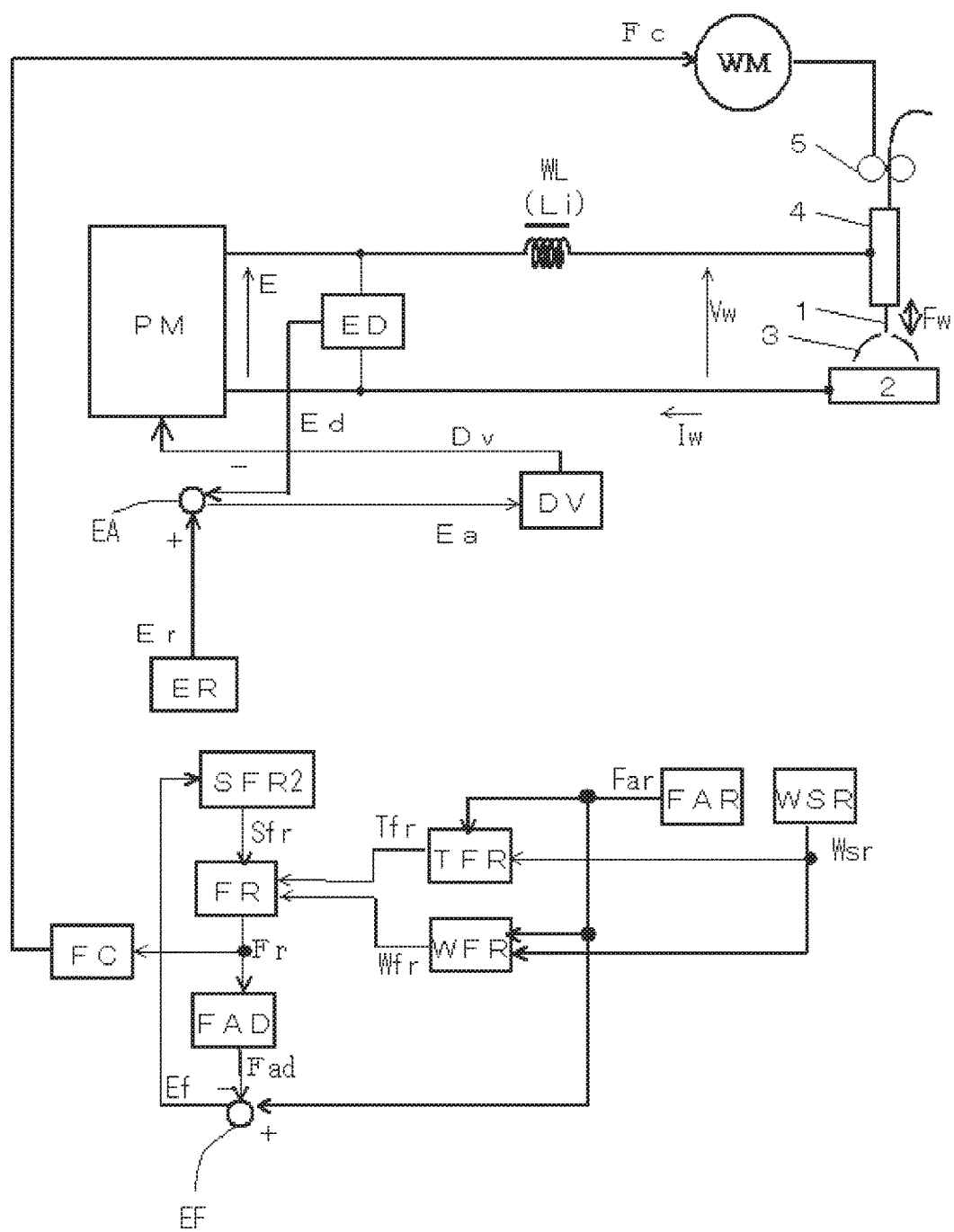
FIG. 3 A block diagram illustrating a welding power supply for implementing an arc welding control method according to a third embodiment of the present invention.

FIG. 3 is a block diagram illustrating a welding power supply for implementing an arc welding control method according to the third embodiment of the present invention. This figure corresponds to FIG. 1, and blocks identical to those of FIG. 1 are referred to by the same symbols, with explanation thereof being omitted. In this figure, an average feeding-rate calculation circuit FAD and a feeding error amplifier circuit EF are added to FIG. 1, and the forward-feeding side shift-amount setting circuit SFR of FIG. 1 is replaced by a second forward-feeding side shift-amount setting circuit SFR2. Hereinafter these individual blocks will be explained with reference to this figure.

Using the feeding-rate setting signal Fr as input, the average feeding-rate calculation circuit FAD calculates an average feeding rate per one cycle and outputs an average feeding-rate calculation signal Fad.

Using the average feeding-rate setting signal Far and the average feeding-rate calculation signal Fad as input, the feeding error amplifier circuit EF amplifies an error between the average feeding-rate setting signal Far (+) and the average feeding-rate calculation signal Fad (−) and outputs a feeding error amplified signal Ef.

Using the feeding error amplified signal Ef as input, the second forward-feeding side shift-amount setting circuit SFR2 integrates the feeding error amplified signal Ef and outputs a forward-feeding side shift-amount setting signal Sfr. This circuit subjects a value of the forward-feeding side shift-amount setting signal Sfr to a feedback control so that a value of the average feeding-rate calculation signal Fad becomes equal to a value of the average feeding-rate setting signal Far.

In FIG. 3, if the welding speed setting signal Wsr outputted from the welding speed setting circuit WSR changes, the cycle setting signal Tfr is set to a suitable value by the cycle setting circuit TFR and the amplitude setting signal Wfr is set to a suitable value by the amplitude setting circuit WFR. Then if the amplitude setting signal Wfr changes, the second forward-feeding side shift-amount setting circuit SFR2 subjects the forward-feeding side shift-amount setting signal Sfr to the feedback control so that the average feeding-rate calculation signal Fad becomes equal to the average feeding-rate setting signal Far. As a result, in (A) of FIG. 4, if the welding speed changes, the cycle Tf and the amplitude Wf are automatically changed to individual suitable values. Thus the forward-feeding side shift amount Sf is changed automatically so that an average value of the feeding rate Fw becomes constant. As an average value of the feeding rate becomes constant, a further stable welding state can be maintained.

Although FIG. 3 shows the case where the function of automatically correcting the forward-feeding side shift-amount is added based on the first embodiment, the configuration in a case of adding this function based on the second embodiment is similar to FIG. 3, with a drawing and explanation thereof being omitted. In this case, if the wire deposition-amount per unit-length of weld signal Md outputted from the wire deposition-amount per unit-length of weld calculation circuit MD of FIG. 2 changes, the cycle setting signal Tfr is set to a suitable value by the second cycle setting circuit TFR2 and the amplitude setting signal Wfr is set to a suitable value by the second amplitude setting circuit WFR2. Then if the amplitude setting signal Wfr changes, the second forward-feeding side shift-amount setting circuit SFR2 being added subjects the forward-feeding side shift-amount setting signal Sfr to the feedback control so that the average feeding-rate calculation signal Fad becomes equal to the average feeding-rate setting signal Far. As a result, in (A) of FIG. 4, if the wire deposition amount per unit length of the weld changes, the cycle Tf and the amplitude Wf are automatically changed to individual suitable values. Thus the forward-feeding side shift amount Sf is changed automatically so that an average value of the feeding rate Fw becomes constant. As an average value of the feeding rate becomes constant, a further stable welding state can be maintained.

According to the third embodiment, even if the amplitude changes, the feeding rate is controlled so that an average value of the feeding rate becomes constant. Consequently the following effects can be achieved in addition to the effects of the first and embodiments. That is, according to this embodiment, even if an amplitude of the feeding rate changes due to a change of the welding speed or the wire deposition amount per unit length of the weld, an average value of the feeding rate is made constant. Thus a further stable welding state can be maintained.

INDUSTRIAL APPLICABILITY

The present invention can provide an arc welding control method which, in the arc welding of alternating feeding of the welding wire between the forward feeding and the reverse feeding, can maintain the welding state stably even if the welding speed or the wire deposition amount per unit length of the weld changes.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-053152.) filed on Mar. 17, 2014, the content of which is incorporated herein by reference.

DESCRIPTION OF REFERENCE NUMERALS 1 welding wire
2 base material
3 arc
4 welding torch
5 feeding roll
DR welding-wire radius setting circuit
dr welding-wire radius setting signal
DR driving circuit
Dr drive signal
E output voltage
EA voltage error amplifier circuit
Ea voltage error amplified signal
ED output voltage detection circuit
Ed output voltage detection signal
EF feeding error amplifier circuit
Ef feeding error amplified signal
ER output voltage setting circuit
Er output voltage setting signal
FAD average feeding-rate calculation circuit
Fad average feeding-rate calculation signal
FAR average feeding-rate setting circuit
Far average feeding-rate setting signal
FC feeding control circuit
Fc feeding control signal
FR feeding-rate setting circuit
Fr feeding-rate setting signal
Fw feeding rate
Iw welding current
MD wire deposition-amount per unit-length of weld calculation circuit
Md wire deposition-amount (signal) per unit length of weld
PM power supply main circuit
Sf forward-feeding side shift amount
SFR forward-feeding side shift-amount setting circuit
Sr forward-feeding side shift-amount setting signal
SFR2 second forward-feeding side shift-amount setting circuit
Tar reverse feeding period in arc period
Tas forward feeding period in arc period
Tf cycle
TFR cycle setting circuit
Tfr cycle setting signal
TFR2 second cycle setting circuit
Vw welding voltage
Wf amplitude
WFR amplitude setting circuit
Wfr amplitude setting signal
WFR2 second amplitude setting circuit
WL reactor
WM feeding motor
WSR welding speed setting circuit
Wsr welding speed setting signal

The invention claimed is:

1. An arc welding control method, the method comprising:
alternately feeding a welding wire between forward feeding and reverse feeding as to a feeding rate with a predetermined cycle and a predetermined amplitude;
generating short-circuiting periods and arc periods to perform welding;
setting the cycle and/or the amplitude based on a welding speed or a wire deposition amount per unit length of weld; and
controlling the feeding rate in a manner that an average value of the feeding rate becomes constant even if the amplitude changes,
wherein setting the cycle includes two operational states, a first operational state in which setting the cycle and/or amplitude is based on a welding speed, and a second operational state in which setting the cycle and/or amplitude is based on a wire disposition amount per unit length of weld.

* * * * *